April 13, 1965     F. C. SMYRNIOTIS     3,177,590
AUTOMOBILE FRONT END ALIGNMENT GAUGE Filed March 22, 1962                      2 Sheets-Sheet 1

INVENTOR,
FRANK C. SMYRNIOTIS.
BY Bedell & Burgess
ATTORNEYS.

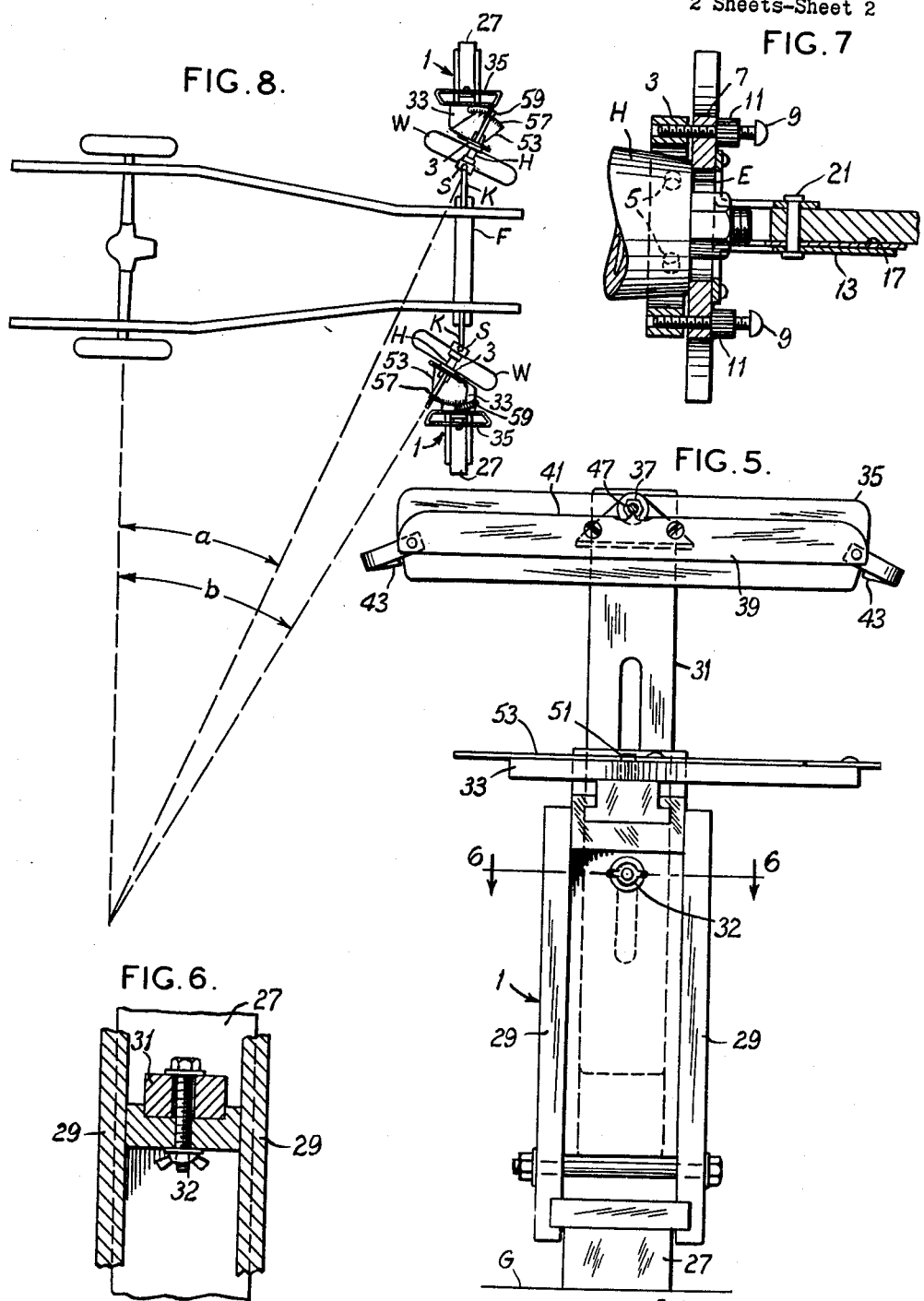

United States Patent Office 3,177,590
Patented Apr. 13, 1965

3,177,590
AUTOMOBILE FRONT END ALIGNMENT GAUGE
Frank C. Smyrniotis, 755 Louwen, St. Louis, Mo.
Filed Mar. 22, 1962, Ser. No. 181,564
19 Claims. (Cl. 33—203.15)

The invention relates to automobile front end alignment gauges and consists particularly in improved apparatus for measuring caster, camber, toe, toe-out on turns, and steering axis inclination.

It is the main object of the invention to provide a simple, inexpensive, yet highly accurate device for measuring automobile front end alignments.

It is a further object to provide a device for taking these measurements directly from the wheel hubs, thereby eliminating the necessity of compensating for lateral wheel runout.

It is a further object to provide a device of this character in which the measurement of caster takes into account steering axis inclination.

Other objects and advantages will be apparent during the course of the following description of the drawings, in which:

FIG. 5 is an inboard side elevational view along line 5—5 of FIG. 3.

FIG. 6 is a horizontal sectional view along line 6—6 of FIG. 5.

FIG. 7 is a horizontal sectional view along line 7—7 of FIG. 3.

FIG. 8 is a top view of two of the gauge devices in working position and the running gear and frame of an automobile being tested for toe-out on turns.

Understanding of the invention will be aided by the following definitions of the alignment characteristics which the gauge is adapted to measure:

Camber is the inclination of the wheels in a vertical plane extending transversely of the automobile; i.e., as viewed from a position in front of the automobile. It may be expressed as the angle between the wheel axis and the horizontal.

Caster is the inclination of the steering axis in a vertical plane extending lengthwise of the automobile; i.e., as viewed from beside the automobile.

Toe is normally expressed as the difference, in fractions of inches, between the transverse spacing of the center lines of the treads measured in a horizontal plane through the wheel axes between the rearward and forward extremities of the wheels respectively.

Toe-out on turns is the difference between the angularity of the front wheels as measured in the horizontal plane when the automobile is making a turn, it being required that the projected axes of both front wheels and of the rear axle intersect at a common center, thus obviously necessitating that the angularity, with respect to the longitudinal axis of the automobile, of the inner front wheels on turns be greater than that of the outer wheel, as best seen in FIG. 8.

Steering axis inclination is the angle between the steering axis and the vertical measured in a vertical plane extending transversely of the automobile; i.e., as viewed from a position in front of the automobile.

Figure 1:
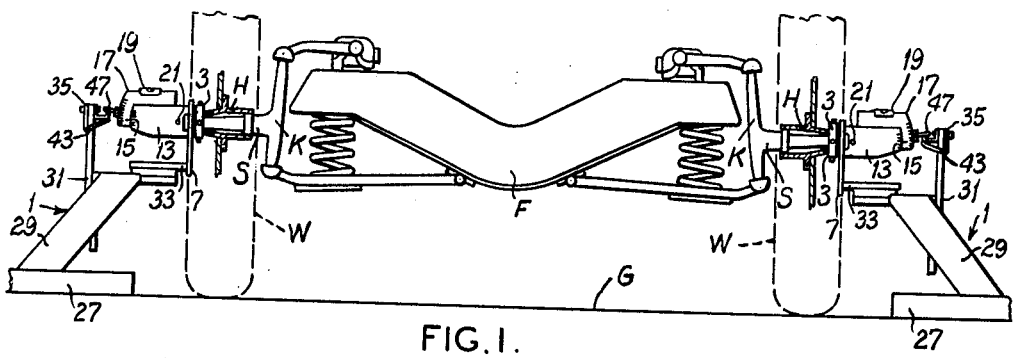
FIG. 1 is a frontal view showing a pair of the gauges in operating position with an automobile front axle in alignment-checking position between them.

Referring now to FIG. 1, the letter F indicates the front axle of an automobile to which are resiliently and pivotally connected steering knuckles K which mount the wheel spindles S, it being understood that in accordance with usual practice knuckles K are connected by the usual steering linkages (not shown) for simultaneous rotation about their upright axes so as to properly direct wheels W which are mounted on spindles S by means of hubs H.

Gauge devices 1 are mounted on a smooth level surface, such as garage floor G and are spaced sufficiently far apart to permit an automobile to be driven between them. For measuring the front end alignment, an automobile is driven between the two gauges until the front axle F is aligned with the gauges and a portion of gauge 1 is clamped to the wheel hubs H.

The hub-mounted portion of the gauge, as shown in part in FIG. 7, comprises a collar 3 adapted to surround the end of the hub and to be held thereon by a plurality of set screws 5, and a mounting plate 7 connected by screws 9 to collar 3 and adapted to be drawn up against the machined end E of hub H by manually tightening the knurled nuts 11 on screws 9, so that the plane of plate 7 is positioned perpendicular to the common axis of hub H and spindle S.

Figure 3:
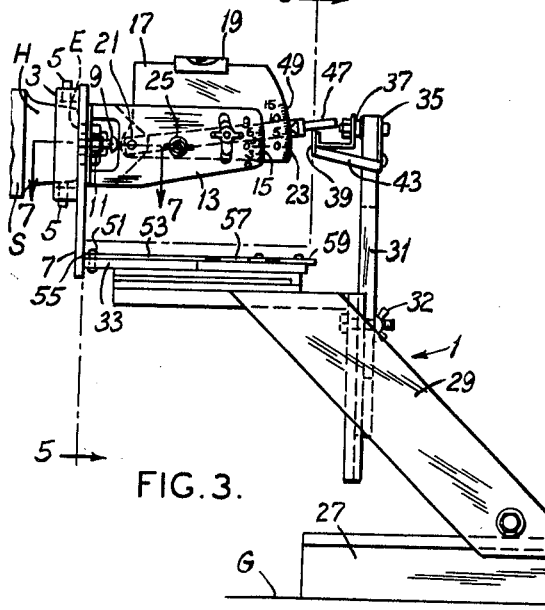
FIG. 3 is a front elevation of one of the gauge devices.
Figure 4:
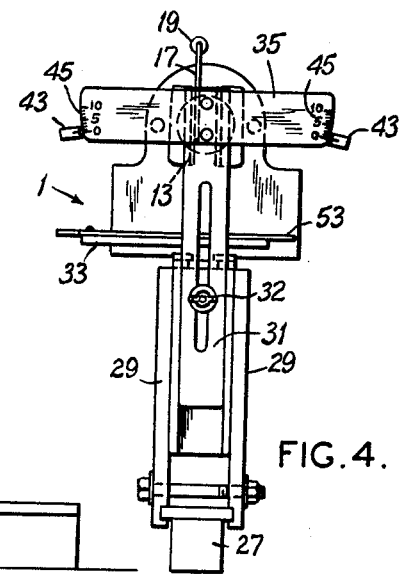
FIG. 4 is an outboard side elevation view of one of the gauge devices.

Mounting plate 7 mounts a fixed plate 13 at right angles to it, i.e., parallel to the axis of the hub, plate 7 having been attached to the hub with the plane of plate 13 vertical. As best seen in FIG. 3, the edge of plate 13 remote from mounting plate 7 is arcuate and is provided with a graduated scale 15 for measuring camber in degrees. A second plate 17, preferably incorporating a spirit level 19, is pivotally connected by a pin 21 to plate 13. With the structure thus described connected to the hub, it will be seen that plate 13 functions as a projection of the hub and of the spindle, so that its angularity from the vertical in the vertical plane transverse of the automobile is the same as the corresponding angularity of the spindle and hub axis. Accordingly by moving level mounting plate 17 about its pivotal axis 21 until spirit level 19 reads level, the intersection of indicator 23 on plate 17 with scale 15 on plate 13 will show the value of camber on scale 15.

Plate 17 may then be locked in level position by nut 25, and this portion of the device will be ready for use in determining caster.

For measuring caster, the floor-mounted portion of the gauge device is utilized in combination with the hub-mounted portion. The floor-mounted portion consists of a stationary base 27 elongated transverse to the longitudinal axis of the automobile being tested, an upwardly inclined support structure 29 slidably mounted on base 27 and providing a support for vertically slidable upright member 31 and horizontally slidably platform 33.

Vertically slidable member 31 can be fixed in selected vertical position by clamping nut 32 and fixedly mounts caster gauge plate 35 at its upper end and pivotally mounts at 37 a bar 39 which has a straight upper edge 41 and at its ends mounts pointers 43 registrable with the arcuate ends of caster gauge plate 35, which are provided with caster measuring scale 45.

For measuring caster, a rod 47 is pivoted to camber gauge plate 13 and level plates 17 by means of previously-mentioned pivot pin 21, and the outer arcuate edge of level plate 17 is graduated at 49 in degrees of steering axis inclination. Since, as described above in connection with measurement of camber, plate 17 has been leveled, by setting rod 47 so that its indicator reads the specification value of steering axis inclination on scale 49, rod 47 will be positioned exactly at a right angle to the steering axis so that rotation of knuckle K about the steering axis would cause rod 47 to generate a plane at right angles to the steering axis.

With the steering gear in its normal centered position, caster gauge 35 is raised until the mid-point of the upper edge 41 of pivoted bar 39 contacts the bottom of rod 47 and the knuckle is rotated about its axis. (It will be noted that the mid-point of upper edge 41 or bar 39 is aligned with the straight major portions of the edge, and that there are slight depressions on either side of the mid-point to prevent binding of rod 47 when it begins to move from its centered position.) If the steering axis is correctly inclined, rod 47 will generate a plane, as described above, and since the intersection of two planes is a straight line, and the engagement of rod 47 with upper edge 41 of bar 39 will cause the bar to assume a constant angular position in its vertical plane which will be at right angles to the caster angle. Caster can then be read on one of the scales 45, depending on whether caster is positive or negative. If steering axis inclination is incorrect, rod 47 will not generate a plane and its intersection with the vertical plane of bar 39 will not be a straight line so that its angular position will not be constant but will vary.

Figure 2:
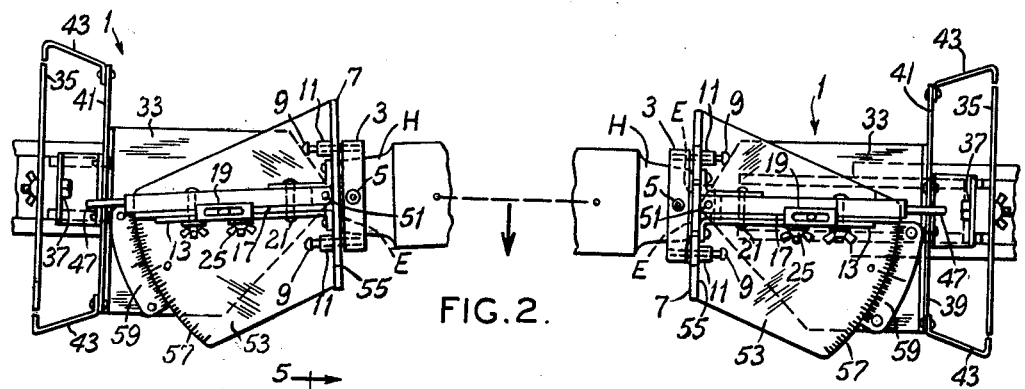
FIG. 2 is a top view of a pair of the gauge devices showing particularly the measurement of toe.

Referring now to FIG. 2, for measuring toe, horizontally slidable platform 33 pivotally mounts, by means of vertical pin 51, a horizontal plate 53 having a straight edge 55 closely adjacent to pin 51, and an opposite edge 57 of arcuate shape concentric with pivot 51, the arcuate edge being substantially entirely offset to one side of a radius perpendicular to straight edge 55 to permit reading of a scale on edge 57 without interference from hub supported structure, particularly plates 13 and 17, and rod 47. Fixed to platform 33 is a short vernier segment plate 59 with its inner edge abutting the outer arcuate edge 57 of horizontal plate 53, the adjacent edges of the two plates having their normally aligned zeros substantially intermediate the ends of the segment plate 59 so that rotation of plate 53 in one direction will show toe-in and in the other direction toe-out. Plate 53 is graduated in degrees along arcuate edge 57; because toe-in and toe-out are commonly measured in fractions of inches, vernier 59 is scaled in thirty-seconds of an inch to permit accurate readings of toe-in and toe-out values.

For measuring toe as seen in FIG. 2, platform 33 is slid along its support on supporting members 29 until straight edge 55 of plate 53 fully engages the outer surface of mounting plate 7, and the steering gear is operated until a zero reading on the high hand 57 is obtained, this indicating that the axis of right hand spindle S is positioned transversely of the automobile. Left hand platform 33 is thereupon slid to the left until the straight edge 55 of left hand plate 53 engages the outer surface of mounting plate 7, and the value of toe-in or toe-out is read to the nearest 1/32 inch on the vernier scale.

Toe-out on turns is measured similarly to the measurement of toe and is illustrated in FIG. 8. As shown in FIG. 8 the steering gear is rotated until one of the wheels is moved to a predetermined angularity which is read on the adjacent scale 57. The angularity of the other wheel is then read on the other scale 57, and as reference to FIG. 8 will indicate, if the outer wheel is set so that the adjacent scale 57 reads the angular value $a$, the inner scale 57 should read the angular value $b$; or, if the inner wheel is set so that its scale 57 reads the angle $b$, the outer scale should read the value $a$. It will be noted that toe-out on turns, unlike toe, is read in degrees on gauge 57, rather than in inches on vernier scale 59. If in the first instance, above, the inner scale reads a different angle from $b$, or, if in the second instance the outer scale reads a different value from $a$, the toe-out is incorrect and the steering gear must be corrected accordingly. Toe-out of the opposite wheel can similarly be measured by directing the wheels in the opposite direction.

Operation of the apparatus is as follows: An automobile is positioned with its front axle F in alignment with gauges 1, as seen in FIG. 1. The hub caps and cups covering the ends of hubs H are removed, collar 3 is placed on the end of hub H and secured thereon by screws 5, and plate 7 is drawn tightly against the machined end of the hub by tightening knurled nuts 11 on screws 9. Plate 17 is then leveled by means of spirit level 19, nut 25 is tightened to hold plate 17 in level position, and the value of camber, in degrees is read on scale 15 on plate 13.

Rod 47 is then set at the specified value of steering axis inclination on scale 49 of plate 17, vertically slidable member 31 is raised until the upper edge of bar 39 engages the bottom of rod 47, the steering wheel is then rotated, and if the actual steering axis inclination is correct, bar 39 will maintain a constant angularity throughout the angular travel of the steering knuckles. This angularity is caster and can be read on one of scales 45 on plate 35. If the angular reading varies during rotation of the steering wheel, it indicates that the steering axis inclination is not in accordance with the specified value and should be corrected.

The next step is the measurement of toe. Platforms 33 are slid until straight edge 55 of plate 53 engages the outer surface of mounting plate 7, and the steering wheel is rotated until a zero reading is obtained on one of the plates 53 (FIG. 2). The vernier adjacent the opposite wheel is then read, giving the value of toe to the nearest 1/32 inch.

Toe-out on turns is then measured by rotating the steering wheel, as shown in FIG. 8, until scale 57 adjacent one of the wheels reads a predetermined angle the value of which is given in the automobile specification. Scale 57 adjacent the other wheel should then read a different predetermined angle, the value of which is also given in the specification, the values of the two angles having been determined in accordance with the principle illustrated in FIG. 8. Toe-out on turns in the other direction is measured similarly, by rotating the steering wheel in the opposite direction until the positions of the wheels are reversed, and repeating the measurement of the angles as set forth above.

The structural features of the above described apparatus may be modified without departing from the spirit of the invention and the exclusive use of such modifications as come within the scope of the appended claims is contemplated.

What is claimed is:

1. Automobile front end alignment measuring apparatus including a horizontal plane surface adapted to support an automobile for testing, and a pair of gauge devices for positioning at opposite sides of the automobile testing position and each comprising a first element having a plane surface and being adapted for securement to an automobile front wheel hub with said first element plane surface perpendicular to the hub axis, a second element pivoted to said first element on a horizontal axis parallel to said plane surface and adapted to be fixed in a level position whereby the angularity of the hub axis from level can be determined, a third element pivoted to said first and second elements on said horizontal axis and having a surface adapted to be set at the specified steering axis inclination for an automobile under test, structure in fixed relation to said plane surface beside the automobile testing position thereon, a member pivoted to said structure on an axis transverse of the automobile testing position and having a normally horizontal straight edge extending lengthwise of the automobile testing position and adapted for sliding engagement with said third element surface whereby to cause tilting of said pivoted member equal to caster of the steering axis of an automobile under test when the steering knuckle is rotated about the steering axis, and a fourth element pivoted to said structure on a vertical axis and having a portion adapted for engagement with said first element to cause displacement of said fourth element from its normal position when said plane surface of said first element becomes disaligned from a line extending longitudinally of the automobile testing position.

2. An automobile front end alignment gauge comprising a horizontal plane surface adapted to support an automobile being tested, a first element having a plane surface and being adapted for securement to an automobile front wheel hub with said first element plane surface perpendicular to the hub axis, a second element pivoted to said first element on a horizontal axis parallel to said plane surface and adapted to be fixed in a level position whereby the angularity of the hub axis from level can be determined, a third element pivoted to said first and second elements on said horizontal axis and having a surface adapted to be set perpendicular to the specified steering axis inclination for an automobile under test, structure in fixed relation to said plane surface beside the automobile testing position thereon, a member pivoted to said structure on an axis transverse of the automobile testing position and having a normally horizontal straight edge extending lengthwise of the automobile testing position and adapted for sliding engagement with said third element surface whereby to cause tilting of said pivoted member equal to caster of the steering axis of an automobile under test when the steering knuckle is rotated about the steering axis, and a fourth element pivoted to said structure on a vertical axis and having a portion adapted for engagement with said first element to cause displacement of said fourth element from its normal position when said plane surface of said first element becomes disaligned from a line extending longitudinally of the automobile testing position.

3. An automobile front end alignement gauge according to claim 2 in which said first element comprises a collar adapted to surround the hub and to be secured thereon, a flat plate connected to said collar transversely of the axis thereof and movable axially with respect thereto, and means for holding a plane surface of said flat plate in abutting relation with the end of the hub.

4. An automobile front end alignment gauge according to claim 2 in which said first element includes a first flat plate and a second flat plate secured to said first plate in perpendicular relation thereto, said first plate being adapted to be held against the flat end of the wheel hub with said second plate extending axially therefrom and being vertically disposed, said second element comprising a plate parallel to said second plate, said second and parallel plates each having adjacent scales graduated in degrees of curvature and having aligned zero marks when the respective plates are level whereby disalignment of said zero marks when said parallel plate is leveled indicates the angularity of said second plate and the automobile hub axis from the horizontal.

5. An automobile front end alignment gauge according to claim 4, in which said third element comprises a rod with its axis parallel to said second and parallel plates and an indicator registrable with the scale on said parallel plate whereby the angularity of said rod from the horizontal can be determined.

6. An automobile front end alignment gauge according to claim 2 in which said fixed structure is movable transversely of the automobile testing position and includes a part movable vertically, said vertically movable part providing the pivotal mounting for said straight edged member.

7. An automobile front end alignment gauge according to claim 2 in which said first and second elements are provided with cooperating indicators and scales for measuring camber when said second element is leveled.

8. An automobile front end alignment gauge according to claim 2 in which said second and third elements are provided with cooperating indicators and scales for setting said third element at the specified steering axis inclination.

9. An automobile front end alignment gauge according to claim 2 in which said pivoted member and said fixed structure are provided with cooperating scales and indicators for measuring caster.

10. An automobile front end alignment gauge according to claim 2 in which said fourth element and said structure are provided with cooperating scales and indicators for measuring toe, and toe-out on turns.

11. An automobile front end alignment gauge according to claim 10 in which one of said scales is graduated in degrees and the other in fractions of inches, the spacing of the graduations on said scales varying from each other to provide a vernier gauge.

12. An automobile front end alignment gauge according to claim 2 in which said first and second elements, said second and third elements, said pivoted member and said fixed structure, and said fourth element and said fixed structure, respectively, are provided with cooperating scales and indicators, for measuring, respectively, camber, steering axis inclination, caster, and horizontal angles consisting of toe, and toe-out on turns.

13. An automobile front end alignment gauge comprising an element adapted to be secured to automobile structure rotatable about the automobile steering axis and having a surface adjustable to perpendicular relation to the specified inclination of the steering axis, a member pivoted on a fixed axis transverse of the automobile position and having a normally substantially horizontal generally straight edge extending lengthwise of the automobile position and adapted for sliding engagement with said surface whereby to cause uniform tilting of said pivoted member equal to caster of the steering axis of an automobile being tested when the rotatable structure is rotated about the steering axis.

14. An automobile front end alignment gauge according to claim 13, in which a fixed member provides the pivotal support for said pivoted member, said members being provided with cooperating scales and indicators for indicating on the former the caster of the automobile steering axis.

15. An automobile front end alignment gauge according to claim 14 in which said element comprises a first member having a plane surface adapted for engagement with the flat end of an automobile hub, a second member in a plane perpendicular to the plane surface of said first member and pivotally mounted on said first member on a horizontal axis parallel to said plane surface, said second member mounting a scale adapted to be set with its zero position in the same horizontal plane as said horizontal axis, and a rod pivotal on said horizontal axis and having an indicator cooperable with said scale whereby said rod may be set at a position perpendicular to the steering axis, said rod providing said adjustable surface.

16. An automobile front end alignment gauge according to claim 15 in which said pivoted member comprises a flat bar adapted to underlyingly engage said rod by means of its upper edge.

17. An automobile front end alignment gauge according to claim 14 in which said fixed member is vertically adjustable to permit said pivoted member to be moved into engagement with the adjustable surface of said element.

18. The method of measuring automobile wheel caster comprising the steps of securing an element to automobile structure rotatable about the steering axis with a narrow elongated surface of said element in perpendicular relation to the steering axis, engaging a normally substantially horizontal generally straight edge of a member pivoted on an axis transverse of the automobile with said narrow elongated surface, and rotating said rotatable structure whereby the straight edge of said pivoted member will assume an inclination from its substantially horizontal position equal to the caster of the automobile wheel.

19. An automobile front end alignment gauge comprising means adapted to support an automobile being tested with the bottom of its wheels in substantially coplanar relation with each other, a first element having a plane surface and being adapted for securement to an automobile front wheel hub with said first element plane surface perpendicular to the hub axis, a second element pivoted to said first element on an axis parallel to said plane surface and adapted to be fixed in a parallel relation to the general plane of the wheel bottoms whereby the angularity of the hub axis from level can be determined, a third element pivoted to said first and second elements on said parallel axis and having a surface adapted to be set perpendicular to the specified steering axis inclination for an automobile under test, structure in fixed relation to said supporting means beside the automobile testing position thereon, a member pivoted to said structure on an axis transverse of the automobile testing position and having a straight edge extending lengthwise of the automobile testing position and adapted for sliding engagement with said third element surface whereby to cause tilting of said pivoted member equal to caster of the steering axis of an automobile under test when the steering knuckle is rotated about the steering axis, and a fourth element pivoted to said structure on an axis perpendicular to the general plane of the automobile wheel bottoms and having a portion adapted for engagement with said first element to cause displacement of said fourth element from its normal position when said plane surface of said first element becomes disaligned from a line extending longitudinally of the automobile testing position.

References Cited in the file of this patent
UNITED STATES PATENTS

| | | |
|---|---|---|
| 1,622,342 | Prather | Mar. 29, 1927 |
| 1,894,532 | Creagmile | Jan. 17, 1933 |
| 1,927,488 | Christensen et al. | Sept. 19, 1933 |
| 1,974,006 | Bennett | Sept. 18, 1934 |
| 2,508,849 | Williams | May 23, 1950 |